(12) United States Patent
Ishii

(10) Patent No.: US 6,821,225 B2
(45) Date of Patent: Nov. 23, 2004

(54) TRANSMISSION APPARATUS FOR A WORKING VEHICLE

(75) Inventor: Norihiro Ishii, Hyogo (JP)

(73) Assignee: Kanzaki Kokyukoki Mfg. Co., Ltd. (JP)

(*) Notice: Subject to any disclaimer, the term of this patent is extended or adjusted under 35 U.S.C. 154(b) by 0 days.

(21) Appl. No.: 10/627,748

(22) Filed: Jul. 28, 2003

(65) Prior Publication Data

US 2004/0058770 A1 Mar. 25, 2004

(30) Foreign Application Priority Data

Aug. 2, 2002 (JP) ........................................ 2002-226045

(51) Int. Cl.[7] .............................................. F16H 47/04
(52) U.S. Cl. ....................................................... 475/74
(58) Field of Search ............................ 475/74; 180/242, 180/248

(56) References Cited

U.S. PATENT DOCUMENTS 3,122,025 A * 2/1964 Colestock et al. ............. 74/11
3,597,998 A * 8/1971 Ebert ........................... 475/74

FOREIGN PATENT DOCUMENTS

JP 1-72416 5/1989
JP 4-297334 10/1992

* cited by examiner

Primary Examiner—Dirk Wright
(74) Attorney, Agent, or Firm—Sterne, Kessler, Goldstein and Fox P.L.L.C.

(57) ABSTRACT

Sun-and-planetary gearing for differentially drivingly connecting the front wheels to the rear wheels is arranged coaxially to a motor shaft of a hydrostatic transmission so as to provide a compact transmission apparatus having the hydrostatic transmission for a working vehicle. The sun-and-planetary gearing includes a first element drivingly connected to the motor shaft rotating integrally with the motor shaft; a second element drivingly connected to front wheels of the working vehicle; and a third element drivingly connected to rear wheels of the working vehicle and differentially connected to the second element through the first element. A differential locking mechanism for locking the second and third elements with each other may be disposed in the transmission apparatus. At least one of the second and third elements may include a shaft drivingly connected to either front or near wheels so that the differential locking mechanism may be disposed on the shaft.

8 Claims, 6 Drawing Sheets

TRANSMISSION APPARATUS FOR A WORKING VEHICLE

BACKGROUND OF THE INVENTION

1. Field of the Invention

The present invention relates to a compact hydrostatic transmission apparatus for a working vehicle with a center differential gearing.

2. Background Art

There is a well-known conventional transmission apparatus for a working vehicle, which distributes power of an engine between a pair of front wheels and a pair of rear wheels, which are differentially connected to each other through a center differential gearing, so as to enable a vehicle having the transmission apparatus to smoothly turn. Japanese Utility Model Application Laid Open Gazette No. Hei 1-72416 discloses a conventional arrangement of a center differential gearing in a transmission apparatus having a hydrostatic transmission (hereinafter referred to as an "HST"), wherein the center differential gearing is interposed between an output shaft for driving front wheels and an output shaft (a final pinion shaft) for driving rear wheels, which are arranged coaxially with each other. Between a motor shaft of the HST and the output shaft for driving front wheels extended forward from the center differential gearing, is interposed a gearing for speed change having a counter shaft disposed in parallel thereto.

Japanese Patent Application Laid Open Gazette No. Hei 4-297334 also discloses a center differential gearing having a cylindrical differential casing, wherein a gearing for speed change is interposed between the differential casing and a shaft that is parallel to the differential casing, and an output shaft for driving front wheels and an output shaft for driving rear wheels disposed coaxially with each other. These shafts are inserted into the differential casing and differentially connected to each other therein.

Thus, a transmission casing is required to be expanded vertically or laterally for housing the conventional center differential gearing constructed on the assumption that the gearing for speed change is interposed between an input member (usually, a differential casing) of the center differential gearing and a shaft which is disposed in parallel to the input member and on the transmittal upstream side of the input member. In other words, the conventional center differential gearing hinders minimization of a transmission apparatus having an HST.

SUMMARY OF THE INVENTION

An object of the present invention is to provide a compact transmission apparatus for a working vehicle, including an HST, which outputs power to sun-and-planetary gearing which differentially connects rear wheels to front wheels.

To achieve the object, a transmission apparatus for a working vehicle according to the present invention comprises an HST including a hydraulic pump which is driven by a prime mover equipped on the working vehicle, a hydraulic motor fluidly connected to the hydraulic pump, a hollow motor shaft serving as an output shaft of the hydraulic motor, and sun-and-planetary gearing including first, second and third elements arranged coaxially to the motor shaft. The first element is drivingly connected to the motor shaft so as to be rotated integrally with the motor shaft. The second element is drivingly connected to front wheels of the working vehicle, and the third element is drivingly connected to rear wheels of the working vehicle and differentially connected with the second element through the first element.

That is, in the sun-and-planetary gearing serving as a center differential gearing, the first element, e.g., a differential casing and a carrier, rotated integrally with the motor shaft, the second element, e.g., a front wheel driving shaft, interlocking with the front wheels, and the third element, e.g., a rear wheel driving shaft, interlocking with the rear wheels, are arranged coaxially to the motor shaft of the HST so as to receive rotation of the motor shaft not through the counter shaft. This saves parts and costs and realizes a compacting transmission apparatus in which a transmission casing is especially minimized so as to ensure a sufficient ground clearance for a mower disposed below the transmission casing. Moreover, since the motor shaft is disposed co-axially with the sun-and-planetary gearing so that the driving force from the motor may be directly transmitted to the sun-and-planetary gearing, the capacity of the HST corresponding to the torque for power transmission to the sun-and-planetary gearing is allowed to be set small.

Preferably, in the transmission apparatus, a differential locking mechanism for locking the second and third elements with each other is provided for equalizing circumferential speed between the front wheels and the rear wheels. Since the second and third elements in the sun-and-planetary gearing are mutually and integrally rotated by the differential locking mechanism, the transmission apparatus enables a vehicle to stably travel on soft or rough ground while preventing the front and rear wheels from idling. This improves the driving performance of the vehicle.

Further preferably, at least one of the second and third elements includes a shaft drivingly connected to either the front or rear wheels, and the differential locking mechanism is disposed on the shaft. In the sun-and-planetary gearing, each of the second and third elements essentially includes such a shaft drivingly connected to either the front or rear wheels in addition to a gear. Therefore, the space around this shaft is used for arranging the differential locking mechanism so as to keep the compact layout in the transmission casing.

With respect to the relative position of the sun-and-planetary gearing and the HST, the sun-and-planetary gearing is preferably disposed forward or rearward of the HST. Further preferably, the transmission apparatus includes a housing for the HST while the sun-and-planetary gearing is disposed outside the housing. Further preferably, a second housing for incorporating the sun-and-planetary gearing disposed outside the housing for the HST is attached to the outside of the housing for the HST. Therefore, the second housing for the sun-and-planetary gearing, projecting outward from the housing for the HST, makes an open space therebelow so as to ensure a sufficient height for raising the mower disposed below the vehicle.

These, other and further objects, features and advantages will appear more fully from the following description.

BRIEF DESCRIPTION OF THE DRAWINGS/FIGURES

DETAILED DESCRIPTION OF THE INVENTION

Figure 1:
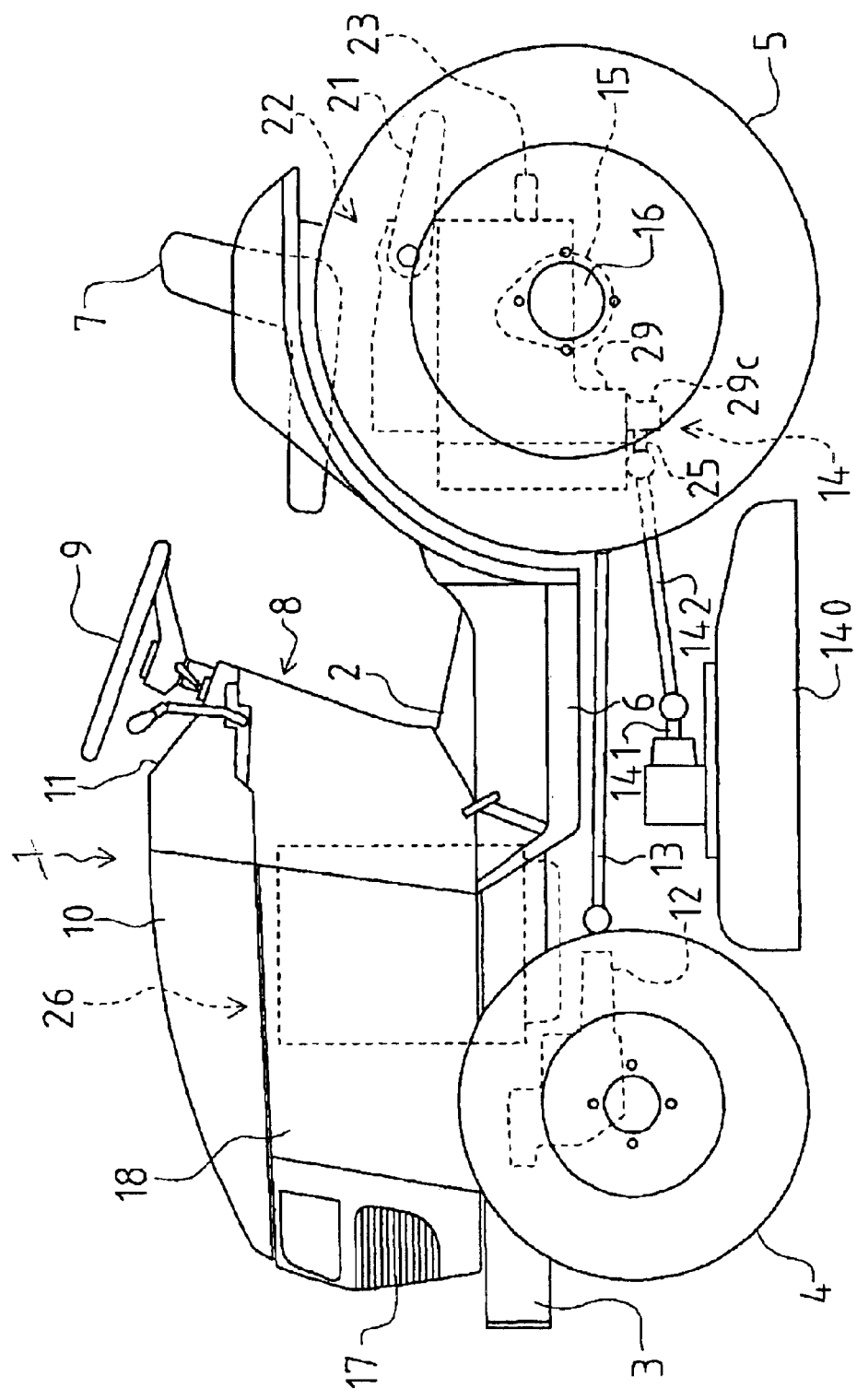
FIG. 1 is a side view of an entire tractor serving as a working vehicle equipped with a transmission apparatus according to the present invention.

Referring to FIG. 1, in a tractor 1, a vehicle frame 3 is disposed lengthwise. A transmission casing 29 of a transmission apparatus 14 is attached at the front surface thereof to the rear end of the vehicle frame 3. Left and right rear axle casings 15 are laterally disposed on the left and right sides of a rear portion of the transmission casing 29. The rear portion of the tractor 1 is applicable for connection with a working machine. A rear PTO shaft 23 for driving the working machine projects rearward from the rear end of the transmission casing 29. A hydraulic lift device 22 including lift arms 21 for raising-and-lowering the working machine is provided on the topside of the end portion of the transmission casing 29.

A mower (mid-mount mower) 140 is suspended below the longitudinally middle portion of the tractor 1. A bottom gearbox 29c, attached upwardly onto the bottom surface of the transmission casing 29, supports a forwardly projecting mid PTO shaft 25 for driving the mower 140. The mower 140 supports an input shaft 141 at the top portion thereof. The input shaft 141 and the mid PTO shaft 25 are connected with each other through a propeller shaft 142 and universal joints.

A front axle casing 12 is supported by the front lower portion of the vehicle frame 3. Front wheels 4 are provided on the respective left and right ends of the front axle casing 12. A pair of left and right rear axles 16 are supported in the respective left and right front axle casings 15, and the rear wheels 5 are attached onto the respective outer ends of rear axles 16. Steps 6 are provided on the respective left and right side ends of the vehicle frame 3. A driver's seat 7 is disposed above the transmission apparatus 14, and a dashboard 8 is vertically mounted on the longitudinally intermediate portion of the vehicle frame 3. An instrument panel 11 is disposed on the top surface of the dashboard 8, and a steering wheel 9 for turning the front wheels 4 is disposed over the instrument panel 11.

An engine 26 is anti-vibratory supported on the vehicle frames 3. Some devices such as a radiator, a battery, an air cleaner and a muffler (not illustrated) are provided around the engine 26 and covered with a front cover 17, side covers 18 and a hood 10.

Figure 2:
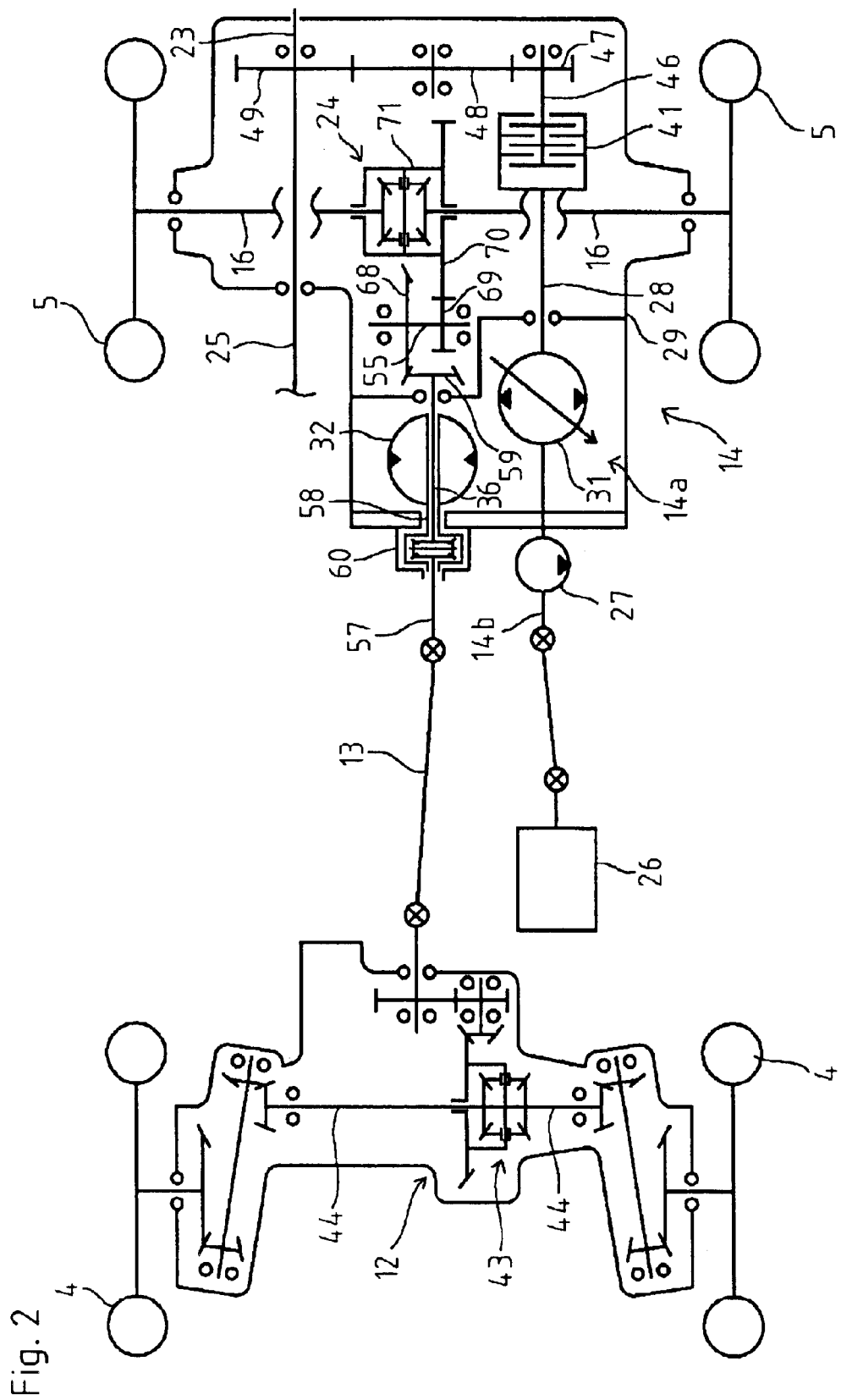
FIG. 2 is a diagram of the transmission apparatus showing entire driving systems for traveling of a vehicle and for power take off.
Figure 3:
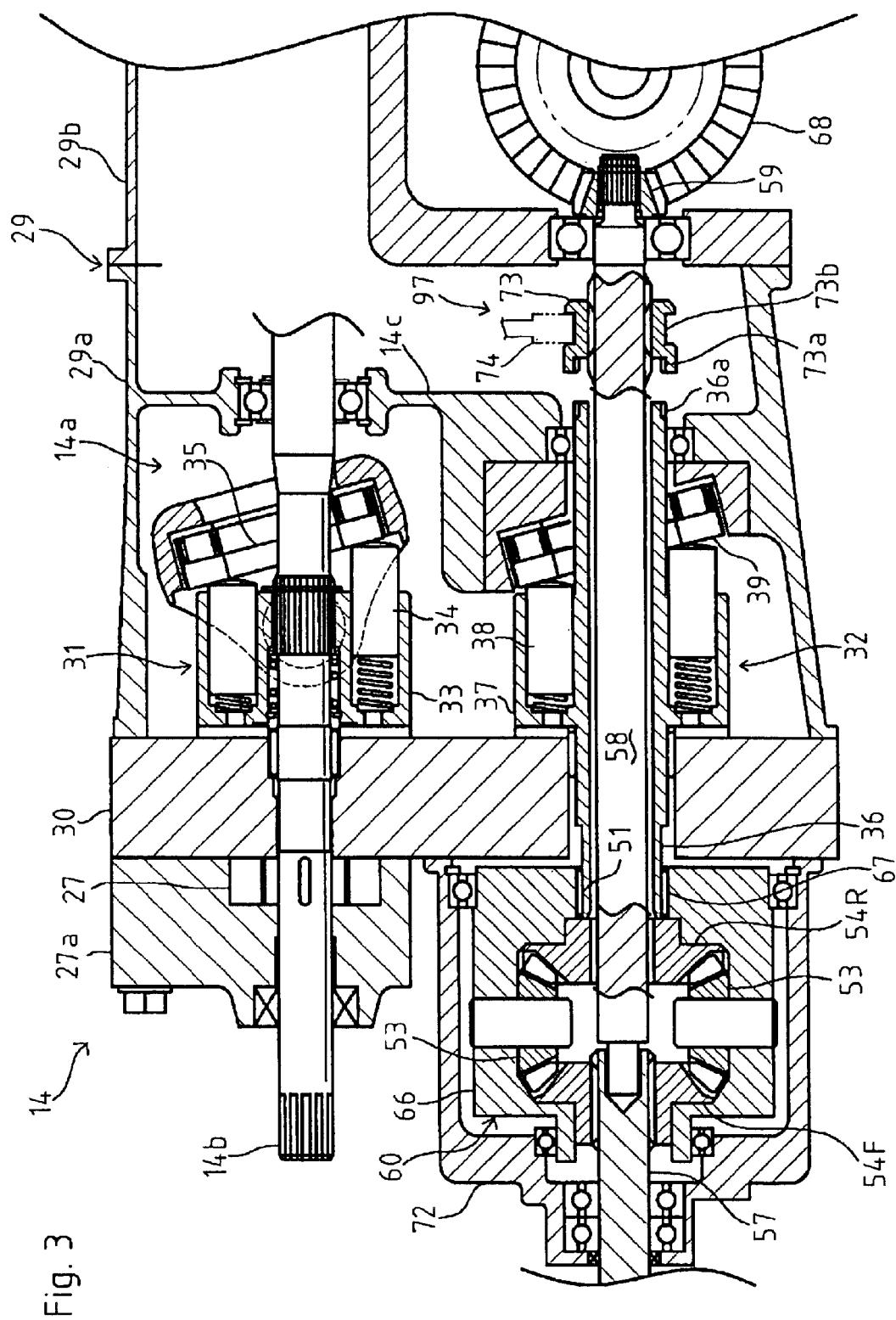
FIG. 3 is a sectional view of a transmission apparatus according to a first embodiment of the present invention.

As shown in FIGS. 2, 3 and others, the transmission apparatus 14 comprises the transmission casing 29, which is separable into a front casing half 29a and a rear casing half 29b. A hydraulic pump 31 and a hydraulic motor 32 fluidly connected with each other constitute a hydrostatic transmission (hereinafter referred to as "HST") 14a serving as a main transmission part of the transmission apparatus 14, which is provided in a front portion of the transmission casing 29, i.e., in a chamber in front of an upright partition wall 14c formed in the front casing half 29a. An input shaft 14b of the HST 14a, i.e., a pump shaft of the hydraulic pump 31, projects forward from the front end of the transmission casing 29.

According to each of embodiments shown in FIGS. 3 to 6, a sun-and-planetary gearing serving as a center differential gearing is disposed in front or rear of the hydraulic motor 32 and has three shafts coaxially projecting therefrom: one is a motor shaft of the hydraulic motor 32, serving as an input shaft of the center differential gearing; another is an output shaft for driving the front wheels 4; and the other is an output shaft for driving the rear wheels 5. Of the three shafts, at least the output shaft for driving the front wheels 4 projects forward in parallel to the input shaft 14b from the front end of the transmission casing 29 so as to be drivingly connected to a front differential gearing 43 (see FIG. 2) in the front axle casing 12 through the propeller shaft 13. Preferably, the hydraulic motor 32 is disposed below the hydraulic pump 31, as shown in FIGS. 3 to 6, so that the output shaft for driving the front wheels 4 projecting the sun-and-planetary gearing is disposed below the input shaft 14b.

A vertical plane center section 30 is attached to the open front surface of the transmission casing 29 i.e., the front casing half 29a so as to fluidly connect the hydraulic pump 31 and the hydraulic motor 32 with each other and to rotatably support the input shaft 14b. The rear surface of center section 30 faces the above-mentioned chamber in front of the partition wall 14c in the front casing half 29a, and forms an upper pump mounting surface and a lower motor mounting surface, onto which the axial piston type hydraulic pump and motor 31 and 32 are mounted so as to constitute the HST 14a. That is, the front portion of transmission casing 29 (the front casing half 29a) between the center section 20 and the partition wall 14c surrounds the HST 14a so as to make a housing for the HST 14a.

A forwardly convex charge pump housing 27a is fixed onto the front surface of the center section 30. The input shaft 14b projects forward through the charge pump housing 27a so as to be drivingly connected to an output shaft of the engine 26. The charge pump housing 27a incorporates a charge pump 27 to be driven by the input shaft 14b. Oil discharged from the charge pump 27 is supplied into the oil passages within the center section 30 as hydraulic oil for the HST 14a, and may be additionally supplied to various portions in the transmission apparatus 14 as lube.

The hydraulic pump 31 of the HST 14a will now be described. As shown in FIG. 3 and others, the input shaft 14b also serving as a pump shaft of the hydraulic pump 31 is disposed lengthwise through the center of the pump mounting surface of the center section 30, and supported by the center section 30 and the partition wall 14c behind the center section 30. A cylinder block 33 is not relatively rotatably disposed axially on the input shaft 14b, and is rotatably slidably fitted onto the pump mounting surface of the center section 30. A plurality of pistons 34 are reciprocally fitted through respective biasing springs into respective cylinder holes bored in the cylinder block 33 around the input shaft 14b and in parallel to the input shaft 14b.

A movable swash plate 35 abuts against the heads of pistons 34. The movable swash plate 35 is tilted so as to change a stroke of the pistons 34, thereby steplessly changing the capacity of the hydraulic pump 31 for discharging hydraulic oil. Circulatory oil passages for hydraulic oil (not illustrated) are bored within the center section 30, thereby supplying the hydraulic motor 32 with hydraulic oil discharged from the hydraulic pump 31.

The hydraulic motor 32 of the HST 14a will now be described. As shown in FIG. 3 and others, a cylinder block 37 of the hydraulic motor 32 is slidably and rotatably fitted to the motor mounting surface of the center section 30. An axially cylindrical motor shaft is integrally made of the member serving as the cylinder block 37, and extended to be directly fitted into the above-mentioned center differential gearing so as to transmit output power from the hydraulic motor 32 to the center differential gearing. One of the two above-mentioned output shafts projecting from the center differential gearing penetrates the motor shaft. A plurality of pistons 38 are reciprocally fitted through respective biasing springs into respective cylinder holes bored in the cylinder block 37 around the motor shaft. A fixed swash plate 39 is fixed to the partition wall 14c and abuts against heads of the pistons 38.

The center differential gearing is directly connected to the motor shaft of the hydraulic motor 32, not through a counter shaft for example, and differentially distributes the rotational force of the motor shaft between the output shaft for driving the front wheels 4 and the output shaft for driving the rear wheels 5. The output shaft for driving the front wheels 5 is extended rearwardly into the rear casing half 29b of the transmission casing 29 so as to be drivingly connected to the rear differential gearing 24 therein. In this way, the HST 14a is driven by the input shaft 14b, serving as a pump shaft, and distributes its output power between the rear differential gearing 24 for the rear wheels 5 and the front differential gearing 43 for the front wheels 4 through the center differential gearing.

The power transmission mechanism from the center differential gearing to the rear wheels 5 and the front wheels 4 through the rear differential gearing 24 and the front differential gearing 43 will now be described in accordance with FIG. 2. The output shaft for driving the rear wheels 5 (in FIG. 2, a rear-wheel driving output shaft 58) extended rearward from the center differential gearing is fixedly provided on the rear end thereof with a bevel pinion (in FIG. 2, a bevel pinion 59). A lateral intermediate shaft 55 is rotatably supported in the rear portion of the transmission casing 29, i.e., in the rear casing half 29b. A bevel gear 68 is fixed on the intermediate shaft 55 and engages with the bevel pinion. The intermediate shaft 55 is also fixedly provided with a small gear 69, which engages with a large gear 70 fixed on a differential casing 71 of the rear differential gearing 24. Therefore, the bevel pinion, the bevel gear 68, the small gear 69 and the large gear 70 constitute a deceleration gear train to the differential casing 71 of the rear differential gearing 24. In the differential casing 71, proximal ends of the rear axles 16 are differentially connected to each other through a differential pinion (or differential pinions) supported by the differential casing 71. In this way, the rotational force of the output shaft for driving the rear wheels 5 projecting from the center differential gearing is transmitted to the rear axles 16 through the rear differential gearing 24 so as to drive the rear wheels 5 provided on the respective outer ends of the rear axles 16.

As mentioned above, the output shaft for driving the front wheels 4 (in FIG. 2, a front-wheel driving output shaft 57) extended forward from the center differential gearing is drivingly, connected to the front differential gearing 43 in the front axle casing 12 through the propeller shaft 13. In the front axle casing 12, left and right differential yoke shafts 44 are laterally oppositely extended from the front differential gearing 43 so as to be drivingly connected to the respective front wheels through respective final deceleration gearings.

The driving system for PTO will be described in accordance with FIG. 2. The input shaft 14b serving as a pump shaft for the HST 14a is extended rearwardly from the hydraulic pump 31 into a rear portion of the transmission casing 29, i.e., the rear casing half 29b, so as to also serve as a PTO clutch shaft 28, which is applicable to be connected to a PTO input shaft 46 through a PTO clutch 41. A gear 47 is fixed on the PTO input shaft 46 so as to transmit power to the mid PTO shaft 25 and the rear PTO shaft 23 through gears 48 and 49. The operation of the clutch 41 is simultaneously effected on both the PTO shafts 23 and 25. Additionally or alternatively, the PTO shafts 23 and 25 may be clutched independently of each other.

The center differential gearing for distributing output power of the hydraulic motor 32 between the front wheels 4 and the rear wheels 5 is a sun-and-planetary gearing which comprises a first element drivingly connected to the motor shaft of the hydraulic motor 32; a second element drivingly connected to the front wheels 4; and a third element drivingly connected to the rear wheels 5 and differentially connected to the second element through the first element, wherein the first, second and third elements are disposed coaxially to the motor shaft (lengthwise). Hereinafter, description will be given on some center differential gearings according to first to fourth embodiments shown in FIGS. 3 to 6. Incidentally, FIG. 2 illustrates a center differential gearing 60 according to the first embodiment shown in FIG. 3 as an example of the center differential.

Description will be given on the center differential gearing 60 according to the first embodiment of the present invention shown in FIG. 3. The center differential gearing 60 is disposed in a housing 72 fixed onto the lower front surface of the center section 30 in front of the hydraulic motor 32 and below the charge pump housing 27a. In correspondence to the center differential gearing 60 arranged in this way, a cylindrical motor shaft 36 integrally formed by the cylinder block 37 of the hydraulic motor 32 rotatably penetrates the center section 30 and projects forward into the housing 72. In the housing 72, the motor shaft 36 is not relatively rotatably fitted at the front end thereof to a differential casing 66 of the center differential gearing 60 through a spline 51 formed on the motor shaft 36 and a spline 67 formed on the differential casing 66 engaging with each other.

The center differential gearing 60 is composed of a sun-and-planetary gearing including the differential casing 66, which serves as the first element drivingly connected to the motor shaft 36; a front-wheel driving output shaft 57 and a differential side gear 54F fixed thereon, which serve as the second element; and a rear-wheel driving output shaft 58 and a differential side gear 54R, which serve as the third element. The rear end of the output shaft 57 and the front end of the output shaft 58 are inserted into the differential casing 66 and fixedly provided thereon with the respective differential side gears 54F and 54R, which differentially engage with each other through differential pinions 53 supported by the differential casing 66.

The rear-wheel driving output shaft 58 is extended rearward from the differential casing 66 and relatively rotatably and axially penetrates the cylindrical motor shaft 36. The rear-wheel driving output shaft 58 projecting rearward from the motor shaft 36 is fixedly provided on the rear end thereof with a bevel pinion 59 engaging with the bevel gear 68. The front-wheel driving output shaft 57, which is rotatably supported by the differential casing 66 through a bearing, projects forward coaxially oppositely to the motor shaft 36 and the rear-wheel driving output shaft 58.

Behind the partition wall 14c, a differential locking mechanism 97 including a locking slider 73 is provided on the rear-wheel driving output shaft 58 between the bevel pinion 59 and the motor shaft 36. For constituting the differential locking mechanism 97, the motor shaft 36 projects rearward from the cylinder block 37 and is rotatably supported by the partition wall 14c through a bearing so as to project rearward from the partition wall 14c. The rear end of the motor shaft 36 is toothed so as to form a clutch claw 36a.

The locking slider 73 is axially slidably but not relatively rotatably spline-fitted onto the rear-wheel driving output shaft 58. The locking slider 73 is toothed at the front end thereof so as to form a clutch claw 73a facing the clutch claw 36a of the motor shaft 36. The locking slider 73 is peripherally formed with an annular groove 73b. A fork 74 is engaged into the annular groove 73b so as to be operable for axially sliding the locking slider 73 on the rear-wheel driving output shaft 58. By sliding the locking slider 73 forward so as to engage the clutch claw 73a with the clutch claw 36a, the rear-wheel driving output shaft 58 is fixed to the motor shaft 36, thereby establishing a differential locking mode where the output shafts 57 and 58, i.e., the front and rear differential gearings 43 and 24 are locked with each other.

Figure 4:
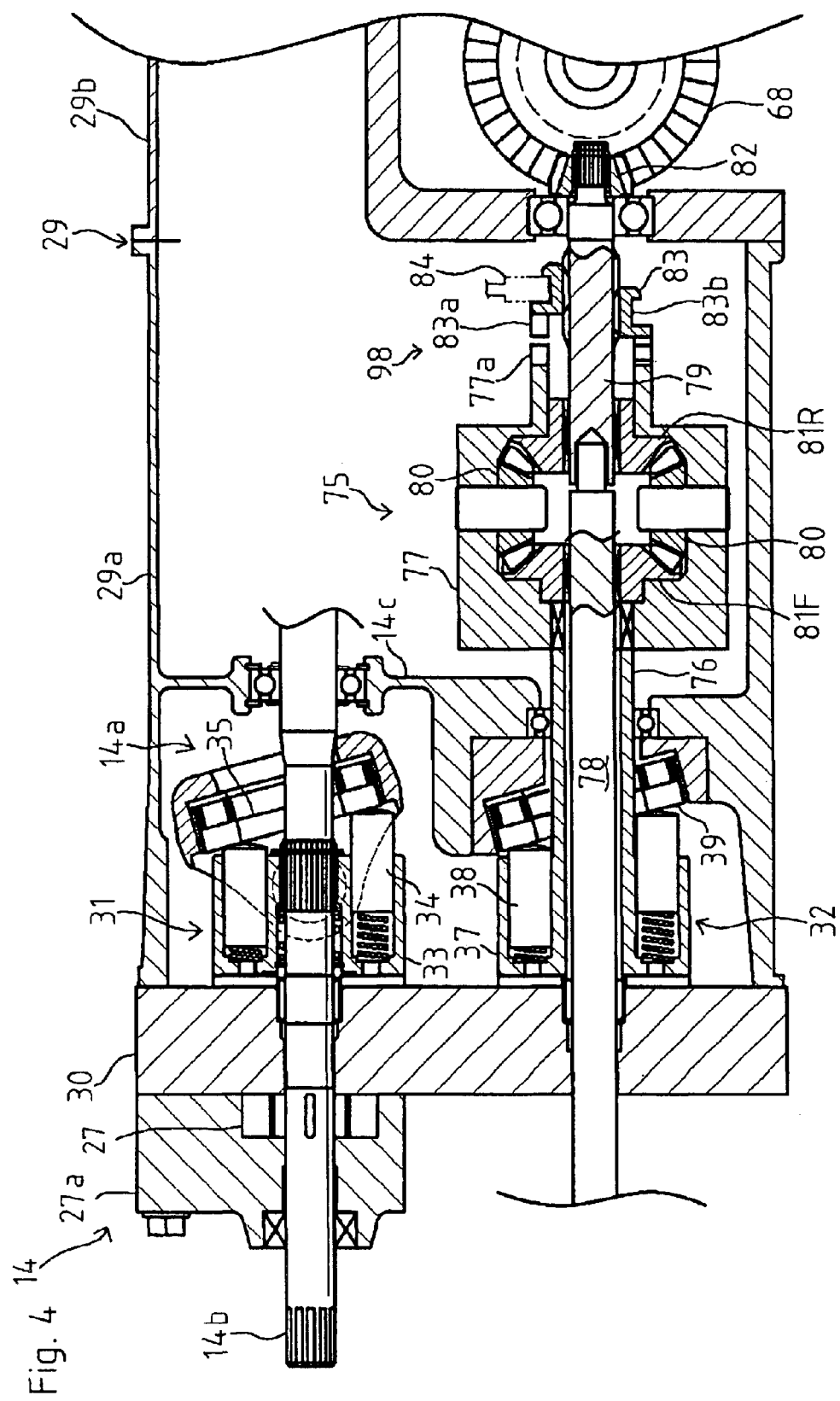
FIG. 4 is a sectional view of a transmission apparatus according to a second embodiment of the present invention.

Next, description will be given on a center differential gearing 75 according to a second embodiment of the present invention shown in FIG. 4. The center differential gearing 75 is composed of a sun-and-planetary gearing, including a differential casing 77, which serves as the first element drivingly connected to a motor shaft of the hydraulic motor 32; a front-wheel driving output shaft 78 and a differential side gear 81 F fixed thereon, which serve as the second element drivingly connected to the front wheels 4; and a rear-wheel driving output shaft 79 and a differential side gear 81R fixed thereon, which serve as the third element drivingly connected to the rear wheels 5. The center differential gearing 75 further comprises a pair of bevel pinions 80 for differentially connecting the output shafts 78 and 79 with each other through the differential casing 77.

In the front casing half 79a of the transmission casing 29, the differential casing 77 is disposed behind the hydraulic motor 32 with the partition wall 14c between the hydraulic motor 32 and the differential casing 77. Therefore, a motor shaft 76 of this embodiment is extended rearward from the cylinder block 37 so as to be journalled by the partition wall 14c through a bearing. The motor shaft 76 projects further rearward from the partition wall 14c and is not relatively rotatably fitted at the rear end thereof to the front end of the differential casing 77.

The front-wheel driving output shaft 78 relatively rotatably and axially penetrates the motor shaft 76. The rear end of the front-wheel driving output shaft 78 is relatively rotatably inserted into the differential casing 77 and fixedly provided thereon with the differential side gear 81F. The front-wheel driving output shaft 78 is extended forward from the motor shaft 76, rotatably penetrates the center section 30, and projects forward from the center section 30 below the charge pump housing 27a so as to be connected to the propeller shaft 13 for driving the front wheels 4.

The rear-wheel driving output shaft 79 is disposed coaxially to the front-wheel driving output shaft 78. In the differential casing 77, the differential side gear 81R is fixed on the front end of the rear-wheel driving output shaft 79 so as to differentially engage with the differential side gear 81F through differential pinions 80 supported by the differential casing 77, thereby differentially connecting the rear-wheel driving output shaft 79 to the front-wheel driving output shaft 78. The rear-wheel driving output shaft 79 is extended rearward from the differential casing 77 and fixedly provided on the rear end thereof with a bevel pinion 82, which engages with the bevel gear 68 for driving the rear wheels 5.

A differential locking mechanism 98 including a locking slider 83 is provided on the rear-wheel driving output shaft 79 between the bevel pinion 82 and the differential casing 77. The rear end of the differential casing 77 is toothed so as to form a clutch claw 77a. The locking slider 83 is axially slidably but not relatively rotatably spline-fitted onto the rear-wheel driving output shaft 79. The locking slider 83 is toothed at the front end thereof so as to form a clutch claw 83a facing the clutch claw 77a of the differential casing 77. The locking slider 83 is peripherally formed with an annular groove 83b. A fork 84 is engaged into the annular groove 83b so as to be operable for axially sliding the locking slider 83 on the rear-wheel driving output shaft 79. By sliding the locking slider 83 forward so as to engage the clutch claw 83a with the clutch claw 77a, the rear-wheel driving output shaft 79 is fixed to the differential casing 77, thereby establishing a differential locking mode where the output shafts 78 and 79, i.e., the front and rear differential gearings 43 and 24 are locked with each other.

Figure 5:
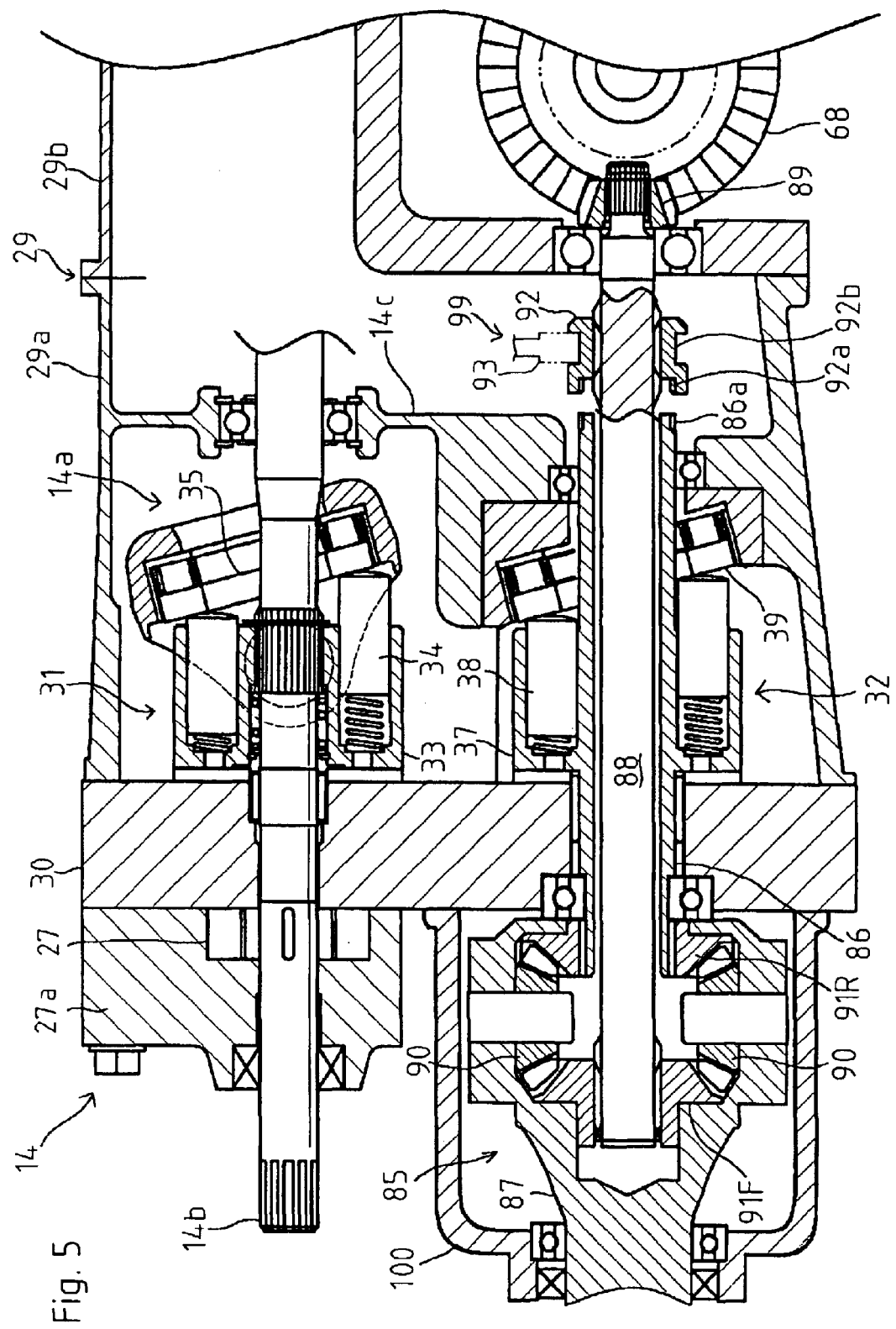
FIG. 5 is a sectional view of a transmission apparatus according to a third embodiment of the present invention.

Next, description will be given on a center differential gearing 85 according to a third embodiment of the present invention shown in FIG. 5. The center differential gearing 85 is disposed in a housing 100, which is attached to the front surface of the center section 30 in front of the hydraulic motor 32 and below the charge pump housing 27a. The center differential gearing 85 is composed of a sun-and-planetary gearing, including a differential side gear 91R, which serves as the first element drivingly connected to a motor shaft of the hydraulic motor 32; a differential casing 87, which serves as the second element drivingly connected to the front wheels 4; and a rear-wheel driving output shaft 88 and a differential side gear 91F fixed thereon, which serve as a third element drivingly connected to the rear wheels 5. The center differential gearing 85 further comprises a pair of differential pinions 90 for differentially connecting the differential casing 87 and the rear-wheel driving output shaft 88 through the differential side gear 91R.

In correspondence to the center differential gearing 85 arranged as mentioned above, a motor shaft 76 of this embodiment is extended forward from the cylinder block 37, rotatably penetrates the center section 30, and is not relatively rotatably fitted at the front end thereof to the rear differential side gear 91R in the differential casing 87.

The differential casing 87 is rotatably supported in the housing 100 and relatively rotatably supports the front and rear differential side gears 91F and 91R. A shaft-like shaped front portion of the differential casing 87 projects forward from the housing 100 so as to be connected to the propeller shaft 13 for driving the front wheels 4.

The rear-wheel driving output shaft 88 relatively rotatably and axially penetrates the motor shaft 86. In the differential casing 87, the rear-wheel driving output shaft 88 is fixedly provided on the front end thereof with the front differential side gear 91F. The front differential side gear 91F differentially engages with the rear differential side gear 91R through the differential pinions 90 supported by the differential casing 87, thereby differentially connecting the rear-wheel driving output shaft 88 to the differential casing 87. The rear-wheel driving output shaft 88 is extended rearward from the motor shaft 86 and fixedly provided on the rear end thereof with a bevel pinion 89, which engages with the bevel gear 68 for driving the rear wheels 5.

Behind the partition wall 14c, a differential locking mechanism 99 including a locking slider 92 is provided on the rear-wheel driving output shaft 88 between the bevel pinion 89 and the motor shaft 86. For constituting the differential locking mechanism 99, the motor shaft 86 projects rearward from the cylinder block 37 and is rotatably supported by the partition wall 14c through a bearing so as to project rearward from the partition wall 14c. The rear end of the motor shaft 86 is toothed so as to form a clutch claw 86a.

The locking slider 92 is axially slidably but not relatively rotatably spline-fitted onto the rear-wheel driving output shaft 88. The locking slider 92 is toothed at the front end thereof so as to form a clutch claw 92a facing the clutch claw 86a of the motor shaft 86. The locking slider 92 is peripherally formed with an annular groove 92b. A fork 93 is engaged into the annular groove 92b so as to be operable for axially sliding the locking slider 92 on the rear-wheel driving output shaft 88. By sliding the locking slider 92 forward so as to engage the clutch claw 92a with the clutch claw 86a, the rear-wheel driving output shaft 88 is fixed to the motor shaft 86, thereby establishing a differential locking mode where the differential casing 87 and the rear-wheel driving output shaft 88, i.e., the front and rear differential gearings 43 and 24 are locked with each other.

Figure 6:
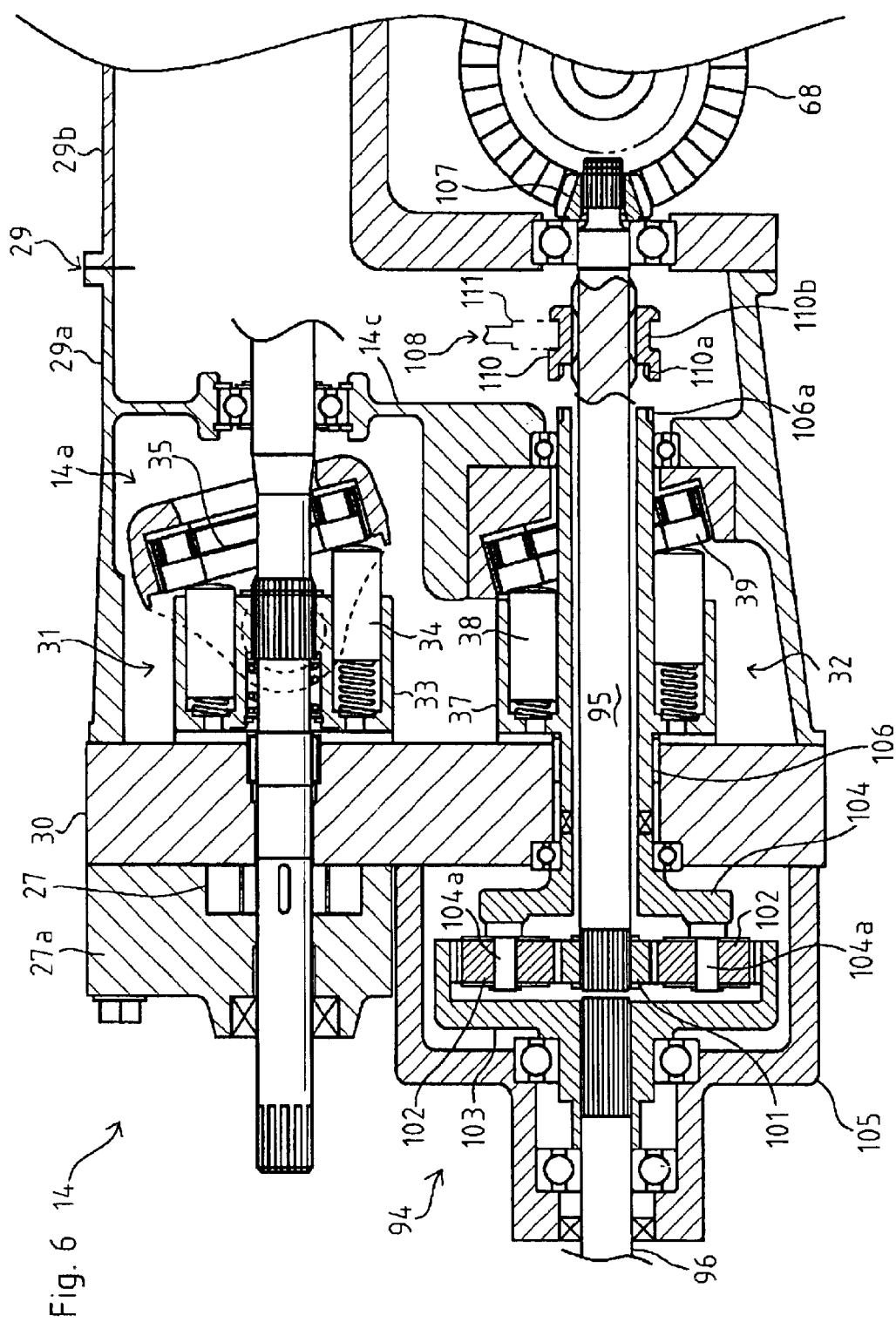
FIG. 6 is a sectional view of a transmission apparatus according to a fourth embodiment of the present invention.

Next, description will be given on a center differential gearing 94 according to a fourth embodiment of the present invention shown in FIG. 6. The center differential gearing 94 is disposed in a housing 105, which is attached to the front surface of the center section 30 in front of the hydraulic motor 32 and below the charge pump housing 27a. The center differential gearing 94 is composed of a sun-and-planetary gearing, including a carrier 104, which serves as the first element drivingly connected to a motor shaft of the hydraulic motor 32; a front-wheel driving output shaft 96 and an internal gear 103 fixed thereon, which serve as the second element drivingly connected to the front wheels 4; and a rear-wheel driving output shaft 95 and a sun gear 101 fixed thereon; which serve as the third element drivingly connected to the rear wheels 5. The center differential gearing 94 further comprises planetary gears 102 for differentially connecting the output shafts 96 and 95 with each other through the carrier 104.

In correspondence to the center differential gearing 94 arranged as mentioned above, a motor shaft 106 of this embodiment is extended forward from the cylinder block 37, and rotatably inserted into the center section 30 so as to be fixed to the carrier 104, which is rotatably supported by the center section 30 and disposed in the housing 105. Support shafts 104a are arranged at regular intervals around the axis of the motor shaft 106 and project forward from the carrier 104 so as to pivotally support the respective planetary gears 102.

The forward-wheel driving output shaft 96 is rotatably supported by the housing 105 and fixedly provided on the rear end thereof with the internal gear 103 in the housing 105. The internal gear 103 surrounds the planetary gears 102 and engages with them. The front-wheel driving output shaft 96 projects forward from the housing 105 so as to be connected to the propeller shaft 13 for driving the front wheels 4.

The rear-wheel driving output shaft 95 relatively rotatably and axially penetrates the motor shaft 106. In the housing 105, the rear-wheel driving output shaft 95 is fixedly provided on the front end thereof with the sun gear 101. The sun gear 101 is disposed among the planetary gears 102 and engages with them. Therefore, the sun gear 101 differentially engages with the internal gear 103 through the planetary gears 102 supported by the carrier 104, thereby differentially connecting the rear-wheel driving output shaft 95 to the front-wheel driving output shaft 96. The rear-wheel driving output shaft 95 is extended rearward from the motor shaft 106 and fixedly provided on the rear end thereof with a bevel pinion 107, which engages with the bevel gear 68 for driving the rear wheels 5.

Behind the partition wall 14c, a differential locking mechanism 108 including a locking slider 110 is provided on the rear-wheel driving output shaft 95 between the bevel pinion 107 and the motor shaft 106. For constituting the differential locking mechanism 108, the motor shaft 106 projects rearward from the cylinder block 37 and is rotatably supported by the partition wall 14c through a bearing so as to project rearward from the partition wall 14c. The rear end of the motor shaft 106 is toothed so as to form a clutch claw 106a.

The locking slider 110 is axially slidably but not relatively rotatably spline-fitted onto the rear-wheel driving output shaft 95. The locking slider 110 is toothed at the front end thereof so as to form a clutch claw 110a facing the clutch claw 106a of the motor shaft 106. The locking slider 110 is peripherally formed with an annular groove 110b. A fork 111 is engaged into the annular groove 10b so as to be operable for axially sliding the locking slider 110 on the rear-wheel driving output shaft 95. By sliding the locking slider 110 forward so as to engage the clutch claw 110a with the clutch claw 106a, the rear-wheel driving output shaft 95 is fixed to the motor shaft 106, thereby establishing a differential locking mode where the output shaft 96 and 95, i.e., the front and rear differential gearings 43 and 24 are locked with each other.

Incidentally, in each of the above-mentioned embodiments, the differential locking mechanism may be alternatively disposed in front of the hydraulic motor 32 or on the axial member for driving the front wheels 4, e.g., the front-wheel driving output shaft 96 in the fourth embodiment.

Although the invention has been described in its preferred form with a certain degree of particularity, it is understood that the present disclosure of the preferred form has been changed in the details of construction and the combination and arrangement of parts may be modified without departing from the spirit and the scope of the invention as hereinafter claimed.

What is claimed is:

1. A transmission apparatus for a working vehicle, comprising:
   a hydrostatic transmission including
   a hydraulic pump driven by a prime mover equipped on said working vehicle,
   a hydraulic motor fluidly connected to said hydraulic pump, and
   a hollow motor shaft serving as an output shaft of said hydraulic motor; and
   sun-and-planetary gearing including first, second and third elements arranged coaxial to said motor shaft,
   wherein said first element is drivingly connected to said motor shaft so as to be rotated integrally with said motor shaft,
   wherein said second element is drivingly connected to front wheels of said working vehicle, and
   wherein said third element is drivingly connected to rear wheels of said working vehicle and differentially connected to said second element through said first element.

2. The transmission apparatus for a working vehicle as set forth in claim 1, further comprising:
   a differential locking mechanism for locking said second and third elements with each other.

3. The transmission apparatus for a working vehicle as set forth in claim 2, wherein at least one of said second and third elements includes a shaft drivingly connected to either said front or rear wheels, and wherein said differential locking mechanism is disposed on said shaft.

4. The transmission apparatus for a working vehicle as set forth in claim 1, wherein said sun-and-planetary gearing is disposed in front of said hydrostatic transmission.

5. The transmission apparatus for a working vehicle as set forth in claim 1, wherein said sun-and-planetary gearing is disposed behind said hydrostatic transmission.

6. The transmission apparatus for a working vehicle as set forth in claim 1, further comprising:

a housing, wherein said hydrostatic transmission is disposed in said housing, and wherein said sun-and-planetary gearing is disposed outside said housing.

7. The transmission apparatus for a working vehicle as set forth in claim 6, further comprising:

a second housing, wherein said sun-and-planetary gearing is disposed in said second housing, and wherein said second housing is attached to said housing.

8. The transmission apparatus for a working vehicle as set forth in claim 1, wherein said working vehicle is a riding lawn mower.

* * * * *